UNITED STATES PATENT OFFICE.

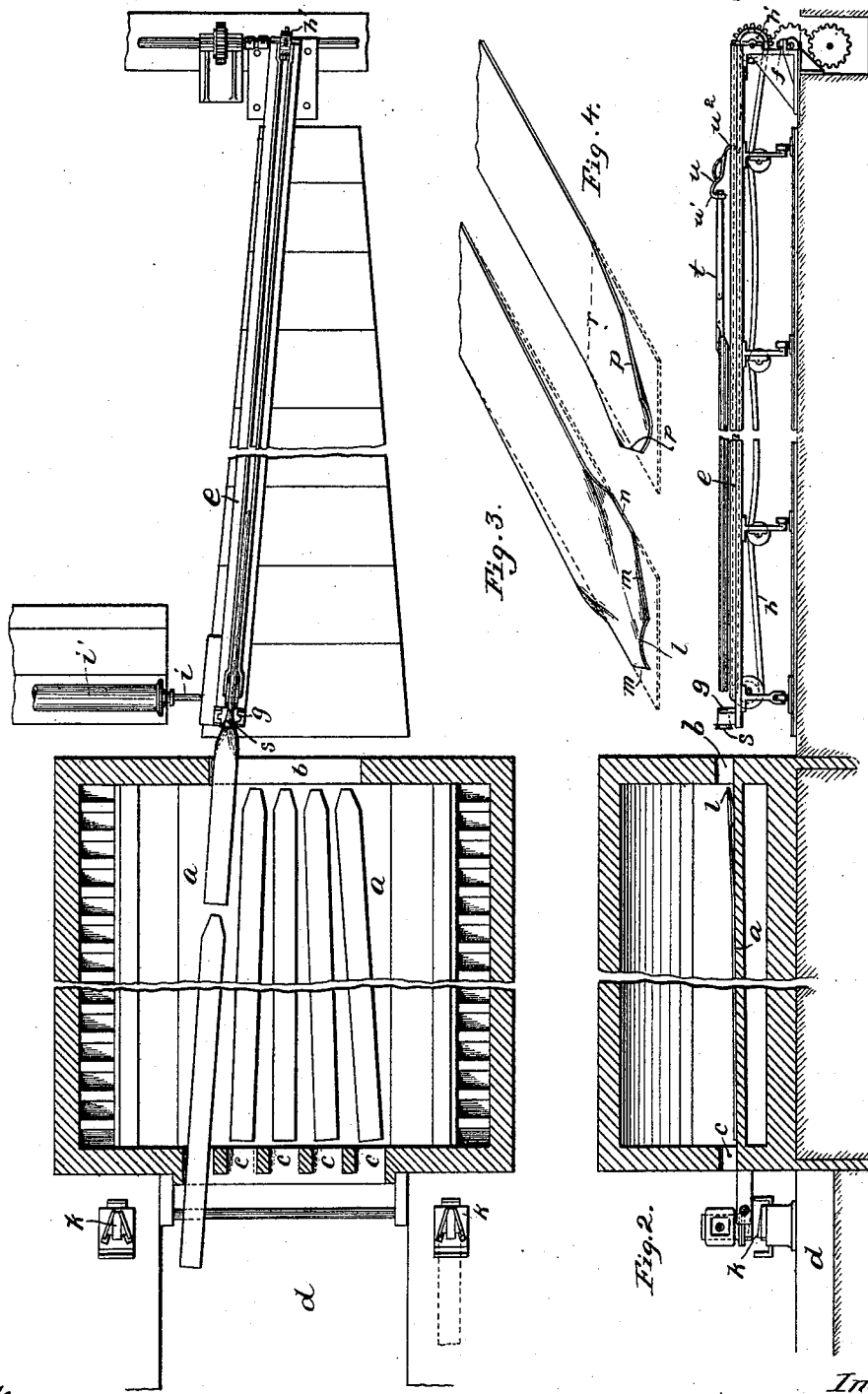

PETER PATTERSON, OF McKEESPORT, PENNSYLVANIA, ASSIGNOR TO THE NATIONAL TUBE WORKS COMPANY, OF NEW JERSEY.

MANUFACTURE OF TUBING.

SPECIFICATION forming part of Letters Patent No. 581,251, dated April 20, 1897.

Application filed March 18, 1896. Serial No. 583,741. (No model.)

*To all whom it may concern:*

Be it known that I, PETER PATTERSON, a resident of McKeesport, in the county of Allegheny and State of Pennsylvania, have invented a new and useful Improvement in the Manufacture of Tubing; and I do hereby declare the following to be a full, clear, and exact description thereof.

My invention relates to the manufacture of butt-weld pipe or tubing from flat metal plates or strips, its object being to overcome certain existing defects and difficulties in this art and to facilitate the manufacture of the tubing, both as to the heating of the plates from which the tubing is formed (including the time consumed for heating and the even heating of the same) and the ease of working, both for feeding the plates to the furnace and the withdrawal of the same therefrom. This class of tubing is formed of comparatively thin flat metal plates or strips, which are raised to a welding heat in a furnace and are then drawn through bell-shaped dies known as "welding-bells," in which the flat strips are bent into circular form and their edges butted together with sufficient force to cause them to weld. The bottom of the heating-furnace has generally been formed of sand, gravel, or like loose material to withstand the high heat, receive the cinder produced by the melting and oxidation of the metal, and permit the plates to slide easily, and has been slightly inclined from front to rear to provide for the discharge of the cinder at the rear end of the furnace.

The usual way of preparing the flat plates prior to heating and drawing them through the welding-bells has been to suitably trim the end to be introduced into the bell and thereby form a tongue thereon, and to bend up the edges of this tongued portion slightly to impart to it a tendency to turn in the bell in the direction in which the edges are bent, and either to secure to this tongued end a drawing-rod termed a "tag" prior to heating the plate or to grasp the tongued end of the heated plate by tongs, and by the tag or the tongs draw it through the welding-bell. The regular method of heating the plate has been to introduce it with the square or untrimmed end foremost into the same end of the furnace from which the plate is to be withdrawn, and when the plate is heated to draw it out by means of the tag or tongs applied to the opposite or tongued end, so that the end of the plate which first enters the furnace is the last to be withdrawn therefrom. The plates or strips are thin and flexible and are generally from eighteen to twenty feet in length. They are difficult to handle, bending and sagging in the hands of the workmen, and are liable when pushed into the furnace to scrape over and tear up the loose gravel bottom, so that it is found necessary to turn up the square or untrimmed end of the plate which is first introduced to enable it to slide over the loose furnace-bottom.

The foregoing is the approved method of making butt-weld pipe at the present time.

The furnace employed for heating the plates or strips in the method above described is necessarily operated at an exceedingly high heat in order to raise the edges of the plate to a welding heat before its body becomes too soft and yielding to force the edges together to form a perfect weld and to provide for the rapid manufacture of the tubing required in the present state of the art, the heat of the furnace being generally so high that in making tubing of the ordinary diameters one minute to one and one-half minutes is sufficient for introducing, heating, and withdrawing the plate. The metal at the edges of the plate must be heated until it is partially molten in order to bring it to the condition known in this art as the "welding heat," and as the edges of the plate are necessarily exposed to the heat more than the central portions they are the first to become partially molten or arrive at the state where the metal is said to "run." The period of time after the metal at the edges of the plate has become molten or begins to run and before the heat has made the body of the plate too soft and yielding to force the edges into full welding contact, or before the metal will become "burned," so as to injure it for the purpose of a pipe, is necessarily a very small fraction of the time required for introducing the plate to the furnace, heating it, and withdrawing it therefrom, and consequently the heating of the edges of the plate throughout its entire length must take place with great uniformity if all portions of the edges are to be brought to the welding heat before any portion of the plate is injured by the heat to such extent as to interfere with the production of merchantable pipe.

The foregoing method of manufacturing butt-weld pipe has several objections or defects, among which are the following: The heat of the furnace is so high that the time required to introduce the plates (which are generally of comparatively thin metal) and to withdraw them is a material part of the time required to bring them to the welding heat, and as the square end of the plate is the part first introduced into the furnace and the last part withdrawn therefrom the edges of that portion of the plate are often too highly heated before the edges of the opposite or tongued portion (which is connected to the drawing-tag or is to be grasped by the tongs) are at a sufficiently high heat for welding, and consequently if the plate be left in the furnace until the edges throughout its entire length are brought to the welding heat some portion or portions are very liable to become overheated, to become too soft, or to be burned, as above referred to.

In the attempt to overcome the defects of introducing the plates at the end of the furnace from which they are withdrawn the usual custom has been to graduate the heat of the furnace from its front end rearward, so that the end of the plate which is first introduced and last withdrawn from the furnace will not be subjected to as high heat as the other portions at or near the opposite end thereof. In order to do this, the gas and air flues of the furnace, from the entrance end inward, are graduated and made smaller as the rear end of the furnace is approached, so as to compensate to some degree for the extra time which the end of the plate first introduced into the furnace necessarily remains therein over that of the opposite end; but when operating at such high heats, where the plates are so rapidly heated, it is extremely difficult to insure control of the heat of the furnace in this way, and the evenness of the heating is affected by the length of time that the plate or strip remains in the furnace, which will necessarily vary a few seconds, and even such brief time will affect the heating of the plate, so that when the furnace is constructed as above described uneven heating of the plates often occurs, and this leads to imperfect welding of part of the plate—for instance, of the end last introduced into and first withdrawn from the furnace, which is not sufficiently heated, or of its body, which is too highly heated and too soft to force the edges into welding contact—or to the burning of the metal, the result in either case being imperfect pipe.

Another practical difficulty arising from the introduction of the plates into the same end of the furnace from which they are withdrawn is the interference between the gangs of men who handle and introduce the plates, known as the "feeders," and the "welder," who controls the heat of the furnace, determines the time of heating, and superintends the withdrawal of the plates, both of whom must be stationed and work at the same end of the furnace. This interference necessarily delays the work, especially where several plates are heated in the furnace at the same time, and as soon as one is withdrawn another is introduced. Furthermore, this charging of the plates in at the same end of the furnace from which they are withdrawn renders it impracticable to employ mechanical chargers for feeding the plates to the furnace.

Efforts have been made to form this butt-weld tubing in the same way that the lap-weld tubing is formed—that is, by first skelping the flat plate or strip, the plate being raised in a suitable brick-hearth furnace to a heat high enough for bending and then drawn through a die which bends it up into tubular or U shape in cross-section. This tubular or U-shaped skelp is then sufficiently stiff to enable it to be pushed into the furnace, and as it is brought by the first operation to approximately the finished shape the difficulties of handling a flat strip and introducing it into the furnace over the gravel bottom are largely overcome. This preliminary skelping operation, however, was very objectionable because it practically doubled the cost of manufacture, requiring separate sets of men to operate the skelping and the welding furnace, while in addition it required the extra fuel and caused a waste of the metal by oxidation or scaling in the preliminary skelping operation, and therefore required a thicker plate to form the same thickness of tube.

Although both in butt and in lap weld tube-making the plates have been bent into tubular or U-shaped skelps and subsequently welded, yet in forming the tubes by butt-welding from the thin flat plates or strips it has been apparently impracticable, on account of the conditions heretofore referred to, to operate practically otherwise than as above described, that is, by introducing the plates at the same end of the furnace from which they were withdrawn, and all of the difficulties and defects of applying the heat, of uneven heating or burning, and of the working of the gangs of men at the same end of the furnace were experienced.

It is the object of my invention to overcome the objections, defects, and difficulties hereinbefore enumerated; and to this end the invention consists, generally stated, in the method of making butt-weld pipe or tubing from thin flat plates or strips of metal, hereinafter more fully described and claimed, by introducing the strip or plate longitudinally through the rear end of the furnace into the furnace-chamber, raising its edges to substantially uniform welding heat throughout its length, and drawing it by the end first introduced from the furnace at the opposite end thereof and through a welding bell or bells, and thereby forcing the opposite edges of the plates into abutting and welding contact.

In practicing my invention I make use of a heating-furnace whose hearth is generally covered with gravel, sand, or like loose material, over which the plates are easily moved and on which they can rest during the heating. The furnace is provided with an opening or openings at its rear end for the introduction of the plates and is preferably of a width to receive from four to six plates arranged side by side. There is also an opening or openings at the front or opposite end of the furnace through which the plates can be withdrawn, the width of the furnace and the openings at its rear and front ends being preferably of such dimensions and so related to each other that several plates can be successively introduced into the rear end of the furnace, be simultaneously heated in the furnace, and be successively drawn from the front end thereof without being brought in contact with each other. The furnace-chamber is maintained by any suitable means at a high welding heat by which the plates when introduced therein can have their edges quickly brought to the desired welding heat throughout their entire length.

It is desirable to trim one end of each of the flat plates before introduction into the furnace, so as to remove the corners and form a projecting central tongue, which is preferably raised to enable it to pass easily over the furnace-bottom and also, if tongs are used in the withdrawal of the plates, to facilitate their application thereto. The plate, with its tongued end foremost, is then inserted from the rear end of the furnace longitudinally into the furnace-chamber and is left in position in the furnace-chamber until it is at the proper heat for welding, when the plate, by means of tongs or other means secured to its tongued end, is drawn from the front end of the furnace and through a suitable welding-bell, whereby it is brought into tubular shape and its edges are abutted and welded together. In practicing this method all parts of the plate are kept in the furnace for substantially the same length of time, including the times of insertion and withdrawal, and by so doing the edges of the plate are brought to substantially a uniform welding heat throughout their entire length and in proper condition to be abutted and welded together in their passage through the welding-bell, thus largely overcoming the defects and imperfections resulting from the uneven heating of the plates by the methods heretofore practiced, improving the quality of the tubing, largely increasing the output, and at the same time providing freer space for the welder in front of the furnace and for the men who introduce the plates at the rear of the furnace and making the use of mechanical chargers practicable.

To work the furnace to its full capacity, it is advisable to have several plates, from four to six, for example, arranged side by side in the furnace at the same time, which plates are introduced successively at the rear of the furnace, and as soon as the edges of the plate first introduced have been brought to a welding heat and the plate is being withdrawn from the front end of the furnace the introduction of another plate in its place in the rear of the furnace may begin, so that the tongued end of the plate being introduced almost immediately follows the rear end of the plate being withdrawn, and inasmuch as the time required for introducing a long plate and withdrawing it from the front end of the furnace is quite a fraction of the time required to bring the edges of the plate to a welding heat by operating in this manner the capacity of the furnace can be fully utilized.

It is evident that the invention can be practiced with many different forms and constructions of furnace, plate trimming and drawing mechanism without sacrificing or materially modifying the important features thereof.

While I do not limit my invention to use with any special forms thereof, I will now describe more particularly mechanism suitable for such purpose and the manner in which the method is practiced therewith. For that purpose I will refer to the accompanying drawings, which show a form and construction of apparatus adapted for use in putting the method into practice, in which—

Figure 1 is a top view of the apparatus, which includes the heating-furnace, drawing mechanism, and other parts hereinafter referred to, the furnace being shown in horizontal section. Fig. 2 is partly a side view and partly a longitudinal section of the apparatus shown in Fig. 1. Figs. 3 and 4 are views of the forward or tongued end of a plate or strip, showing the bending of the same.

In the figures of the drawings, $a$ represents the bottom or hearth of the furnace, which, as above shown, is of sufficient width to receive several flat plates. This hearth $a$ is built of any material suitable for the purpose and is generally covered over with a layer of gravel, sand, or like loose material on which the plates rest during heating. The furnace is heated by any suitable regenerative or recuperative means, the drawings illustrating a suitable arrangement of air and gas flues close to the side walls of an ordinary regenerative furnace. The furnace-flues, as here shown, are arranged to give substantially the same heat throughout the chamber instead of being graduated to give a varying heat, as above described. At the front end of the furnace is an opening $b$, through which the heated plates are drawn by the drawing mechanism, and at the rear end of the furnace is a series of openings c, preferably corresponding to the number of plates to be placed in the furnace, for the introduction of the plates at the opposite end to that from which they are drawn after being raised to the welding heat. At the rear end of the furnace is a suitable pit d, extending for the greater part of the width of the furnace, in which the workmen may stand when introducing the plates, and at the opposite end of the furnace is any suitable form of drawing mechanism, one form of such mechanism being illustrated in this case by the draw-bench e and its special construction being as follows: The draw-bench is pivoted at or near the rear end thereof, as at f, so that its front or forward end can swing across the the mouth b of the furnace and be drawn into line with any of the plates on the hearth a, the draw-bench illustrated being practically of the same construction as shown in Letters Patent granted to me December 3, 1889, No. 416,374, and having the bell-holder g at its front end and the traveling chain h, which is mounted on suitable grooved pulleys in a guideway on the swinging draw-bench and is driven by the sprocket-wheel h', to which power is applied in any suitable way. Engaging with the front end of the bench is the piston-rod i, which is operated by steam, hydraulic, or other power through the cylinder i', to move the draw-bench to the desired position in front of the furnace.

Located at any suitable point in the works, but preferably in proximity to the rear end of the furnace, are the shears k, by means of which the front ends of the plates are trimmed, the corners being removed therefrom and centrally-projecting portions or tongues l formed on the plates, the shear-knives in the shears k being set to trim the same and bend it to the shape required. It is considered desirable that this tongue l shall be raised or bent upward, so that the front end of the plate is of such shape that it will slide over the surface of the loose gravel bottom or hearth, and also, if tongs are used to withdraw the plates, to facilitate their attachment thereto. The bend of this tongue may of course be varied, the shape shown in Fig. 3 illustrating the shape of the tongue where the bell is intended to act on the plate by bending its sides downwardly to bring it to cylindrical shape and weld it, while the shape shown in Fig. 4 is one preferably employed where the bell acts upon the plate by bending its sides upwardly to weld. In either case the tongue, while of proper shape to enter the welding-bell, is preferably raised to enable the plate to slide more easily over the surface of the hearth and also to facilitate the application thereto of tongs or other drawing appliance. In Fig. 3 the plate is shown as trimmed at m, and its side portions n back of the trimmed portions are bent down, while the tongue l is slightly curved in the direction the plate is to be bent by the bell, the front tongue portion being thus raised for the purpose above indicated. In Fig. 4 the plate is trimmed at p and its front end is bent upwardly, as at r, while the tongue is slightly curved in the direction in which the plate is to be bent by the bell. The plates as so trimmed may be conveniently piled in proximity to the pit or working space d, so that they are in position to be quickly lifted by the workmen and introduced through any of the ports or openings c at the rear of the furnace into the furnace-chamber or to be handled by a charging-machine employed to perform the same work.

In connection with the formation of the pipe or tubing I employ any suitable form of welding-bell, as s, and any suitable construction of tongs or other device which can be attached to the tongued end of the plate can pass through the bell and then be connected with the drawing mechanism. As shown in the drawings, the tongs t may be used for this purpose and may be engaged with the drive-chain h by a hand-tool u, having hooks at each end, the forked hook u' engaging with the tongs, while the other hook $u^2$ engages with the draw-chain.

In practicing the invention with the form of apparatus shown in the drawings the plates are properly trimmed in the shears and the gang of workmen at the rear end of the furnace known as the "feeders" insert the flat plates through the openings c into the furnace-chamber one after the other until a sufficient number of plates are entered within the furnace, these plates resting on the gravel furnace-bottom in their regular positions for drawing therefrom. These plates are inserted in the furnace longitudinally with their trimmed or tongued ends e foremost, which trimmed ends pass easily over the furnace-bottom without disturbing the surface thereof to any extent, acting practically as the front ends of sled-runners, so as to provide for the slipping of the plates over the gravel or sanded surface of the furnace-bottom, this being made practicable by providing a tongued end on the plate, which is both suitable for slipping over the furnace-bottom entering the welding-bell and, if tongs are used to withdraw the plate, for being gripped thereby, so as to be drawn through the welding-bell. I thus make practicable the introduction of these long, thin, and flexible metal plates at the rear end of the furnace and the withdrawal of the same at the front end thereof, giving all the advantages herein set forth. As the plates are brought to the proper heat for welding the draw-bench is brought into line with each plate and one plate after the other is gripped by the tongs t and drawn through the welding-bell s, causing the flat plate to turn up into cylindrical form within the bell and abutting and pressing the edges thereof firmly together, so as to weld them and form the welded tubing. During this operation the welder, who stands at the front end of the furnace, can generally direct his attention solely to the advanced or tongued end of the plate to ascertain when its edges are at a welding heat, and he is thus relieved from the trouble and strain of watching the plate throughout its entire length, as must be done when the plates are withdrawn from the same end of the furnace at which they are introduced in order to determine at what instant, in view of the average heated condition of the plate as a whole, it should be withdrawn to give the best result. By my method, where the plates are withdrawn from the opposite end of the furnace to which they are introduced, the end of the plate first introduced will necessarily be brought to the desired welding condition sooner than those parts which were subsequently introduced and lie nearer the rear of the furnace, because the furnace is operated at such high heat that the time required for the introduction of the long plate and its withdrawal from the furnace forms an appreciable part of the time required for bringing the cold plate to the welding heat, and as soon as the welder sees that the edges of the plate nearest to the tongued end are commencing to run and are therefore at the proper condition for welding he commences to withdraw the plate before such molten condition is indicated on the edges for the entire length of the plate and without special examination of its entire length, since he knows that as the plate is drawn through the furnace the high heat will bring its rear portions to the proper welding condition by the time they reach the front end of the furnace. By operating in this way the welder can more easily determine when the edges of the plate are at the proper heat, and such edges throughout their entire length can have substantially a uniform welding heat at the instant they pass into the welding-bell, while the body of the plate can be sufficiently rigid to press the edges together with the necessary force to make a good weld and to form such weld at or near the forward end of the pipe.

As hereinbefore referred to, as soon as one plate begins to be withdrawn from the furnace the workman at the rear end of the furnace can start in a fresh plate to occupy the position of the plate being withdrawn, and as the advanced or tongued end of the fresh or cold plate can follow closely after the rear end of the plate being withdrawn a very material saving of time and corresponding increase of output can be effected as compared with the results obtained by the prior methods of introducing the plates into the same end of the furnace from which they are withdrawn, so that a fresh or cold plate could not be introduced until the heated plate had been entirely withdrawn from the furnace. The output for this reason can be considerably increased.

By the practice of my method, as hereinbefore set forth, I am enabled in a large measure to overcome the defects and difficulties heretofore encountered in the manufacture of butt-weld tubing arising from the uneven heating of the plates when introduced into and withdrawn from the same end of the furnace, and while applying an extremely high heat I produce a plate whose edges are more evenly heated throughout their length for the welding operation and obtain a more even welding of the tube formed from such plate. I am also enabled to utilize the full capacity of the furnace and to largely increase its output, probably from twenty to twenty-five per cent. A higher heat can also be obtained in the furnace because flues of full size can be employed for the full length of the furnace, instead of flues gradually decreasing in size from the front toward the rear thereof. At the same time I provide a freer space for the welder to do his work in the front of the furnace free from interference by the feeders who introduce the plates, while the latter have also abundant room to carry on their operations at the rear of the furnace. The employment of mechanical charging mechanisms for introducing the flat plates into the furnace is also made practicable.

What I claim as my invention, and desire to secure by Letters Patent, is—

1. The herein-described method of forming butt-weld tubing from flat plates or strips of metal, which consists in introducing a flat plate longitudinally through the rear end of a furnace into the furnace-chamber, raising its edges to substantially a uniform welding heat throughout its length, and drawing it by the end first introduced through the opposite or front end of the furnace and through a welding-bell, and thereby forcing its edges together and welding it into tubing, substantially as set forth.

2. The herein-described method of forming butt-weld tubing from flat plates or strips of metal, which consists in trimming and bending one end of a plate so as to form a raised tongue thereon, inserting the plate with its raised tongued end foremost through the rear end of the furnace into the furnace-chamber, raising its edges to substantially a uniform welding heat throughout its length, and drawing it by the raised tongued end through the opposite or front end of the furnace and through a welding-bell, and thereby forcing its edges together and welding it into tubing, substantially as set forth.

3. The herein-described method of forming butt-weld tubing from flat plates or strips of metal, which consists in feeding a series of flat plates successively side by side through the rear end of a furnace into the furnace-chamber, raising their edges to a welding heat therein in the respective positions in which they rest when so fed, and drawing them successively by the ends first introduced from the opposite or front end of the furnace and through a welding-bell, and feeding in a fresh or cold plate in line with the one being withdrawn, substantially as set forth.

4. The herein-described method of forming butt-weld tubing from flat plates or strips of metal, which consists in feeding a series of flat plates successively side by side through the rear end of a furnace into the furnace-chamber, raising their edges to a welding heat therein in the respective positions in which they rest when so fed, and drawing them successively by the ends first introduced from the opposite or front end of the furnace and through a welding-bell, and feeding in a fresh or cold plate in line with the one being withdrawn and before it has been entirely withdrawn from the furnace, substantially as set forth.

5. The herein-described method of forming butt-weld tubing from flat plates or strips of metal, which consists in trimming and bending one end of the plate so as to form a raised tongue thereon, inserting the plate with its raised tongued end foremost through the rear end of the furnace into the furnace-chamber, raising its edges to substantially a uniform welding heat throughout its length, grasping the raised tongued end by means of tongs or similar devices, and drawing the plate thereby through the opposite or front end of the furnace and through a welding-bell, and thereby forcing its edges together and welding it into tubing substantially as set forth.

In testimony whereof I, the said PETER PATTERSON, have hereunto set my hand.

PETER PATTERSON.

Witnesses:
CHARLES PATTERSON,
A. HENNERS.